Jan. 27, 1970        HIROSHI INOSE ET AL        3,492,435
FOUR-WIRE CONCENTRATOR WITHOUT SEPERATE CONTROL PATH
Filed July 13, 1966                           9 Sheets-Sheet 1
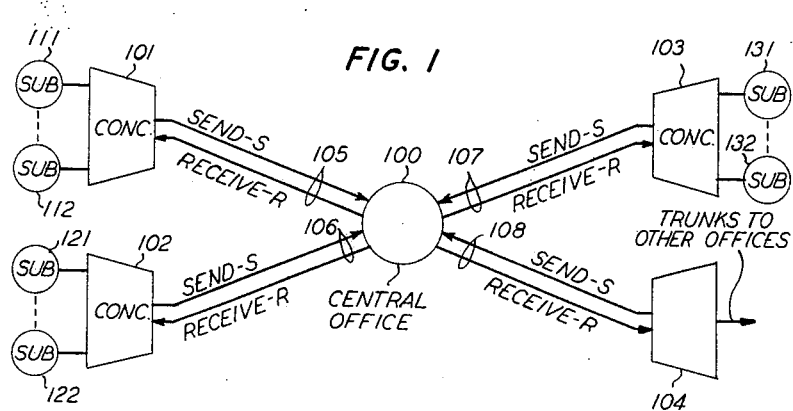
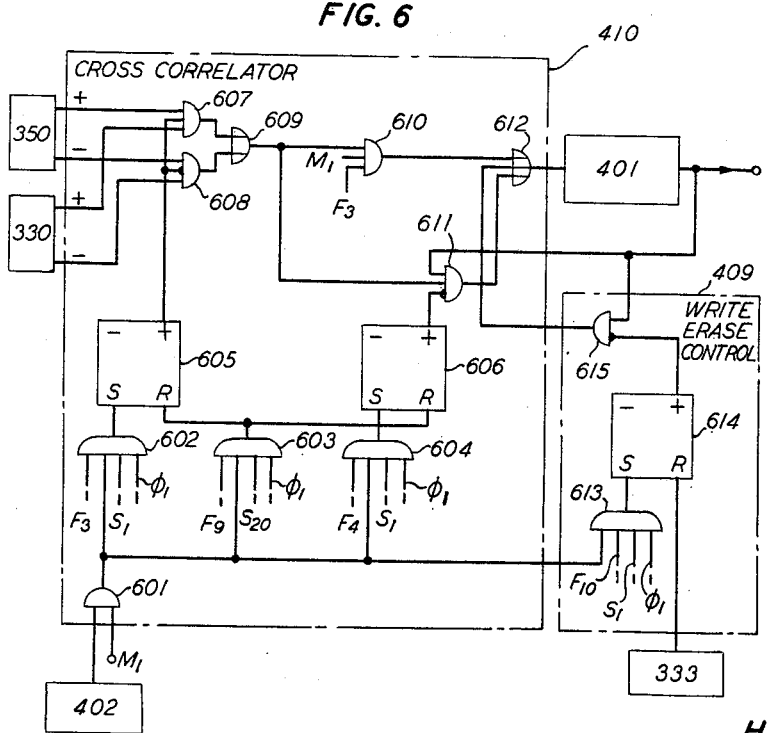
INVENTORS H. INOSE
T. SAITO
BY
R.C. Winter
ATTORNEY

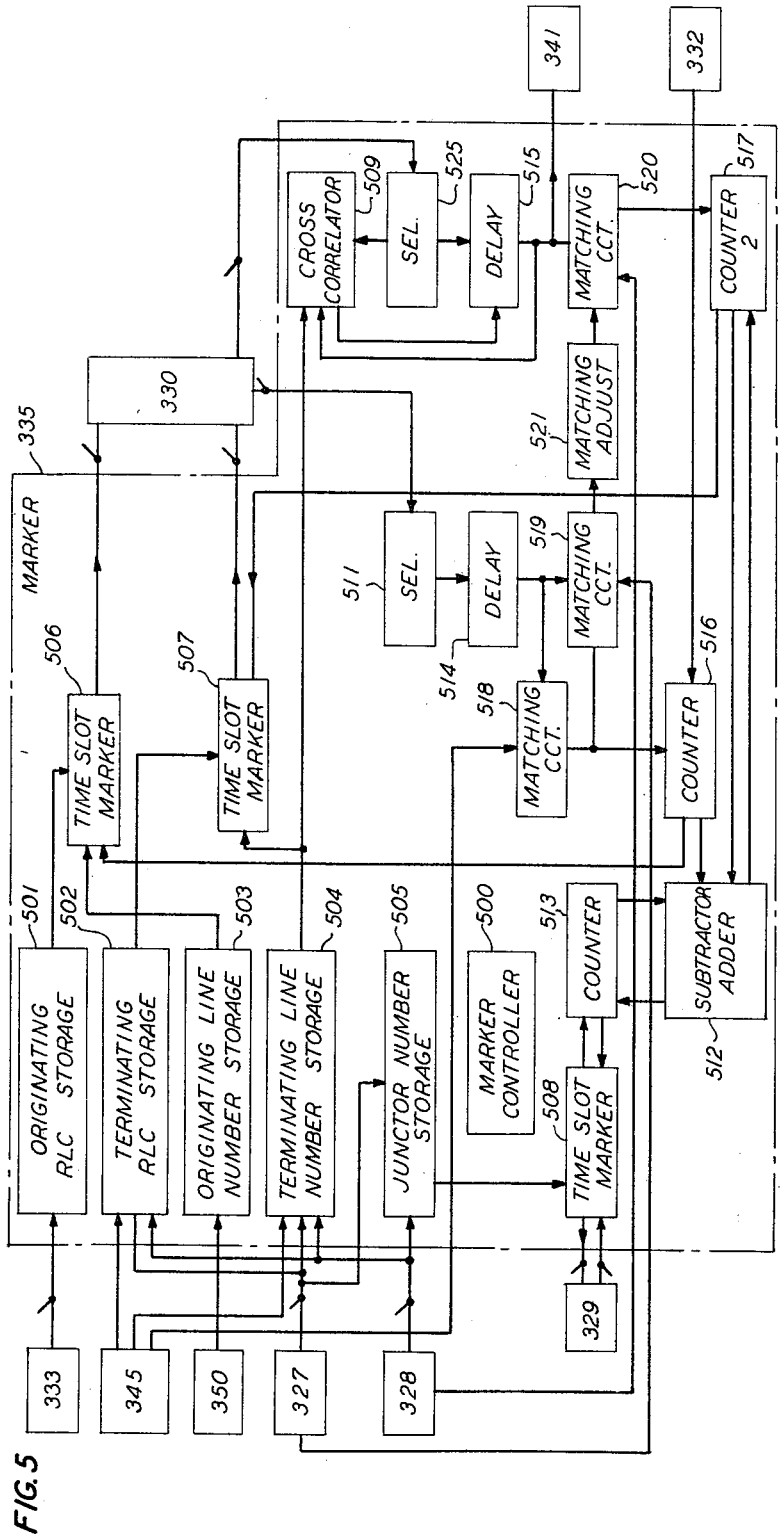

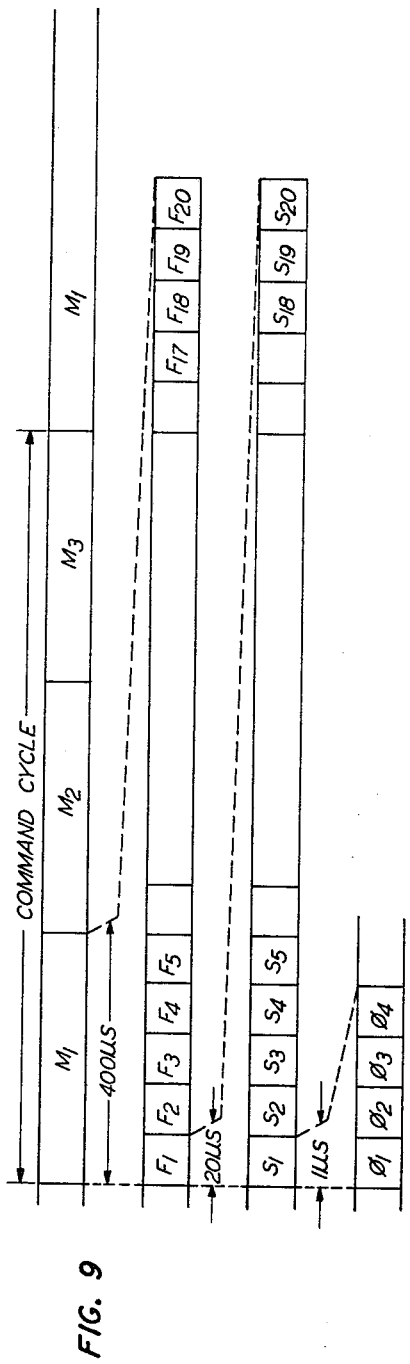
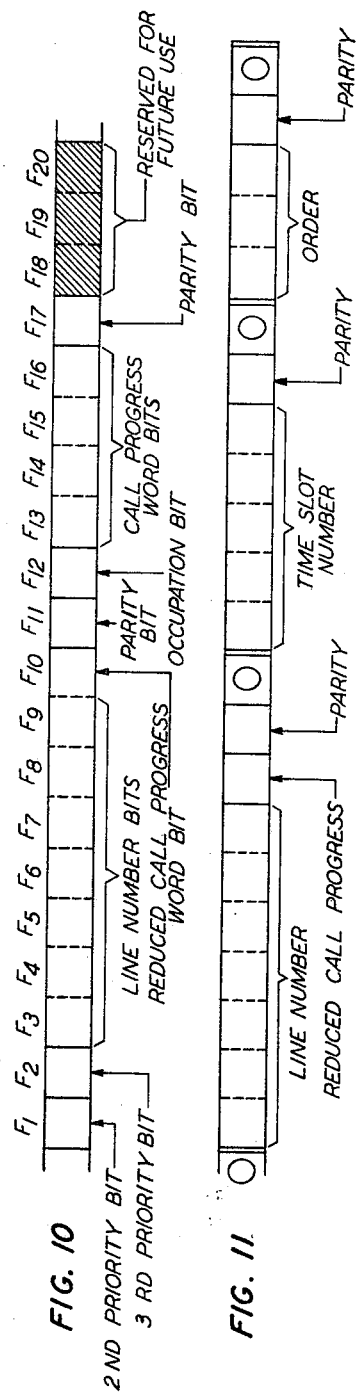
FIG. 9
FIG. 10
FIG. 11

United States Patent Office 3,492,435
Patented Jan. 27, 1970

3,492,435
FOUR-WIRE CONCENTRATOR WITHOUT SEPARATE CONTROL PATH
Hiroshi Inose and Tadao Saito, Tokyo, Japan, assignors to Bell Telephone Laboratories, Incorporated, Murray Hill and Berkeley Heights, N.J., a corporation of New York
Filed July 13, 1966, Ser. No. 564,891
Claims priority, application Japan, Aug. 7, 1965, 40/47,748, 40/47,749
Int. Cl. H04m 3/00
U.S. Cl. 179—18　　　　　　　　　　　　　18 Claims

ABSTRACT OF THE DISCLOSURE

A time division switching system is disclosed in which all intelligence and control signals are transmitted from a central office to a remote line concentrator via one multiplex two-wire path and from the remote line concentrator to the central office via another multiplex two-wire path. No separate control path is required.

---

This invention relates to communication systems and more particularly to a time division communication switching system comprising a central office for controlling the establishment of call connections among lines terminating on remote line concentrators which are connected to the central office by signal transmission highways.

In some communication systems an electrical connection established between a calling and called line is maintained without interruption for the duration of the call. Dependent upon traffic requirements, quantities of switching facilities are maintained in various centralized locations and specific idle switches therein are selected as required to establish a link for a particular call. Such a system arrangement is referred to as "space separation" in which privacy of conversation is assured by the separation of individual conversations in space.

In contrast, other communication systems operate on a time separation basis in which conversations conducted concurrently among a number of active pairs of lines share a single transmission path or highway. Privacy of each conversation is assured in such systems by the separation of individual conversations in time. Thus each call is assigned to the common highway for an extremely short but rapidly and regularly recurring interval, and the connection between any two lines in communication is completed only during these assigned intervals or time slots. Signal samples which retain essential characteristics of the original intelligence signal are transmitted over corresponding time channels in the highway in these time slots and are utilized in the called line to reconstruct the original intelligence signal.

Systems which concentrate remote subscriber lines in groups and connect each group to a central office by a common highway comprising a two-wire unilateral transmission path in each direction take full advantage of the economies afforded by the use of time separation techniques. Thus a send path and a receive path on which all conversations are time multiplexed for serial transmission in corresponding time channels replaces a number of costly cable pairs required to carry each individual conversation in space separation system. In such a line concentrator type of system arrangement, as disclosed for example in H. Inose et al. Patent 3,223,784 issued Dec. 14, 1965, the central office exercises control over the various operations performed at each line concentrator, and for this purpose control wires are added to the pair of intelligence signal transmission paths in the highway to convey supervisory and control signals between a remote concentrator and the central office. It is evident that additional economies can be effected by eliminating these control wires.

Therefore, it is a general object of this invention to provide an improved time separation communication system.

It is another object of this invention to reduce the transmission facilities required in a time separation telephone system.

More particularly it is an object of this invention to eliminate separate control leads between a central office and remote line concentrators in a time separation telephone system.

These and other objects of the invention are attained in one specific illustrative embodiment wherein a time separation telephone system comprises distinct groups of telephone lines remote from one another and connected through corresponding switching networks, referred to as line concentrators, to a common control center or central office essentially in the manner described in the aforementioned Inose et al. patent. The telephone lines associated with each line concentrator are controlled on a time separation basis such that the various concentrators are each connected to the central office via a corresponding common transmission highway.

In accordance with our invention the highway provides the only connection between a line concentrator and the central office, all control signals occupying a distinct time channel in the send and receive paths. The central office sends commands to the line concentrator via the control time channel in the highway receive path requesting changes in the status of call connections. The line concentrator in turn examines the command for errors and then compares its content with information stored in the concentrator to determine if the stored information also is error free. If no error is discovered, the command is executed and action is taken at the concentrator to formulate a response or answer command for transmission to the central office via the control time channel in the highway send path which reflects this situation. The central office responds to this answer command by proceeding to the next command in a call progress sequence. If an error is discovered the command will not be executed, and the answer command will cause the central office either to repeat the command or to return a new command which is effective to erase the stored informed and to substitute the correct information.

It is a feature of this invention that the line concentrator comprises a minimum of control facilities since all error correction is performed at the central office by means of the commands and answer commands transmitted in the control time channel of the highway.

It is another feature of this invention that the line concentrator comprises a memory which stores the line number of each subscriber line active on a call connection and a call status indication which serves to transmit to the central office either a signal indicating the condition of a particular subscriber line or an intelligence signal sample from the subscriber line.

It is further feature of this invention that the commands be prefixed by a synchronization code which will not shift its position despite the occurrence of as many as four simultaneous errors.

It is another feature of this invention that the central office includes a marker which supervises the processing of all call connections in three distinct stages and with only one call connection being processed at a time.

More particularly, it is a feature of this invention that the idle marker is first engaged in response to a request for service by a calling line and assigns an idle time slot and corresponding time channel to the calling line. The marker is next engaged by a register which stores the called line designation and serves at this time to assign an idle time slot and corresponding time channel to the called line, thereby completing a call connection. Finally, the idle marker is engaged upon receipt of a disconnect indication from the calling line, at which time it serves to disestablish the call connection.

It is a still further feature of our invention that the control information characters in a message required for control of all call connections involving lines terminating on a remote concentrator are stored serially in a circulating memory in a distributed form in which a different character is stored in each appearance of a distinct time slot in a repetitive cycle of time slots, which distinct time slot corresponds to the time channel assigned to one of the call connections.

It is still another feature of this invention that a portion of the distributed content of the memory is compared with the number designting a particular line terminating on the remote concentrator and, in response to a match of the compared characters, all of the characters stored in consecutive appearances of a corresponding time slot and forming a single message are retrieved from the memory.

It is yet another feature of this invention that the marker assigns an idle time slot to a calling line by simply comparing the characters stored in a single cycle of time slots in the memory with "idle-busy" time slot indications received from the line number register. This is possible due to the fact that only one of the characters stored in the particular cycle of time slots utilized in this comparison reflects a condition corresponding to the idle time slot indication from the line number register.

A complete understanding of this invention and of the above-noted and other features thereof may be gained from consideration of the following detailed description and the accompanying drawing, in which:

FIG. 1 is a block diagram representation of a communication switching system comprising a central office, a plurality of line concentrators connected to the central office and a plurality of subscriber lines or trunks connected to each of the concentrators;

FIG. 5 is a block diagram representation of the marker illustrated in FIG. 3B;

FIG. 6 is a schematic representation of the crosscorrelator circuit depicted in block form in FIG. 4;

FIG. 9 is a timing chart illustrating a command cycle, a memory cycle and an office cycle or frame in the common control operation at the central office;

FIG. 10 depicts the content of one memory cycle utilized in the control operations at the central office in accordance with this invention;

FIG. 11 depicts the content of a typical command transmitted from the central office to the line concentrator of FIG. 2; and FIGS. 12A–12C depict the composition of various forms of a command synchronization code which precedes all commands transmitted to the remote concentrator.

THE SYSTEM

Figure 2:
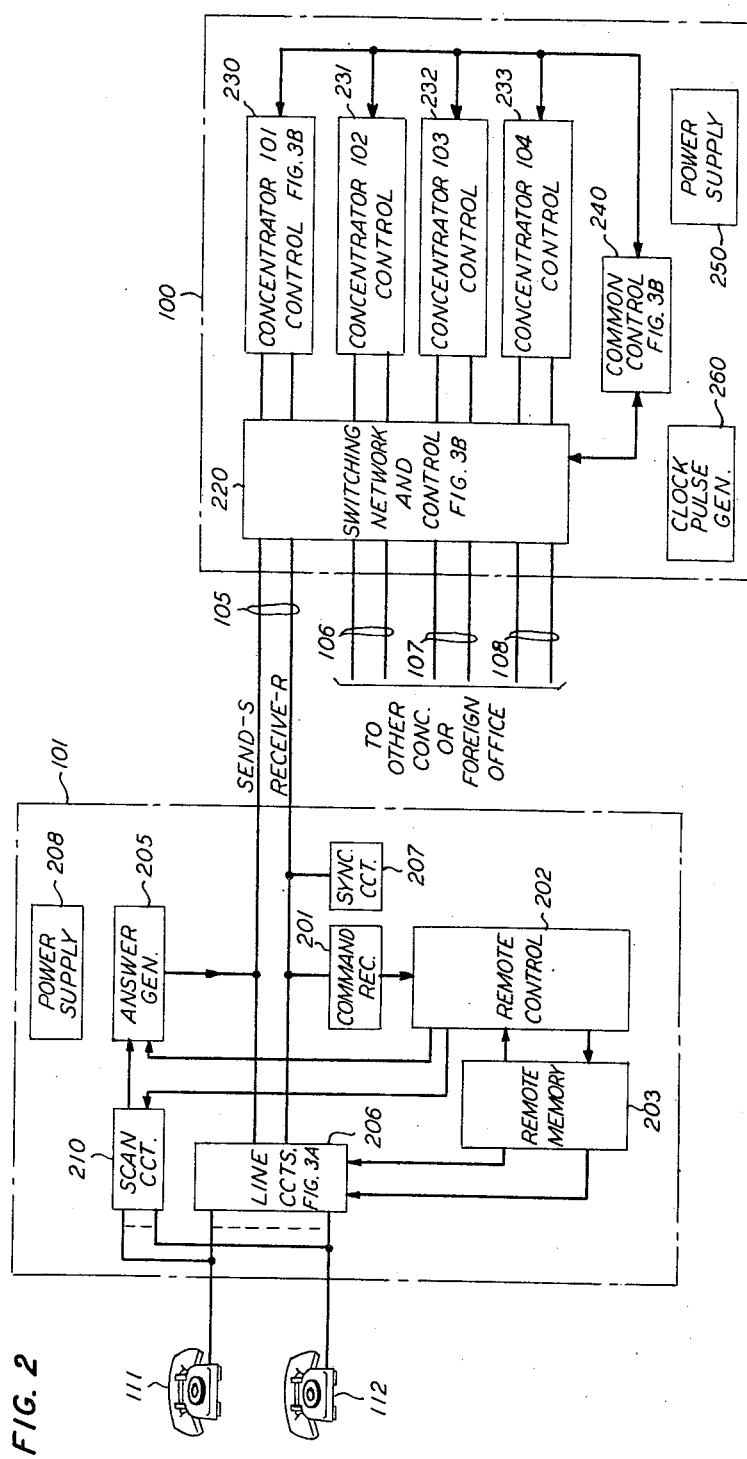
FIG. 2 is a representation in block diagram form of particular facilities available in a line concentrator and in the central office depicted in FIG. 1.

Turning now to the drawing, the time division communication switching system depicted in FIG. 1 comprises line concentrators such as 101, 102 and 103 interoffice trunk concentrator 104, each connected via corresponding transmission highways 105 through 108 to the common control equipment at central office 100. The line concentrators are so named because of the connection thereto of a plurality of individual subscriber lines concentrated in the same area. Each interconcentrator or intraconcentrator connection, as well as the connection between a concentrator and a foreign exchange, is completed through central office 100 via the appropriate time division multiplexed channels in the highways 105–108.

Central office 100 assigns to a calling subscriber line, i.e., one originating a call connection, a particular time slot in a recurring cycle of time slots during which the number of a called or terminating line designated by the calling subscriber is transferred through a corresponding time channel in the highway between the associated remote concentrator and the central office. If the desired called line is idle, a time slot is assigned thereto, and the call connection completed. Subsequent communication between calling and called lines is conducted by transmission of information between the central office and the concentrators terminating the respective lines via the highway time channels corresponding to the assigned time slots.

If available, the same time slot will be assigned to both calling and called lines. However, with subscribers located in different remote areas, the same time channel may not be available in the highways connecting both areas so that a different time slot will have to be assigned to the called line. In this event, a time slot interchange operation, as disclosed, for example, in H. Inose et al. Patent 3,172,956 issued Mar. 9, 1965, is performed in order to transfer information between calling and called lines which are assigned different time slots. Similarly, other call connections are assigned distinct time slots in the recurrent cycle of time slots.

In systems of this type which are known in the art, each highway comprises send and receive paths for transfer of signals between lines in communication, such signals being referred to hereinafter as intelligence signals. In addition, each highway comprises control leads for transfer of various control signals therebetween for purposes of establishment and supervision of call connections by the central office. Such control leads, of course, increase the system cost by the number of additional cable pairs required. In our system, however, all control signals are transmitted over the highway send and receive paths during a preassigned time slot and thus occupy a distinct time channel in the highway which does not interfere with the transmission of intelligence signals in other time channels. This, of course, permits elimination of all control leads and reduces each of the highways to a single pairs of wires. For example, all intelligence and control signals from concentrator 101, FIG. 1, will be transmitted to central office 100 via the send-S path of highway 105 in the various assigned time multiplex channels and, similarly, all intelligence and control signals generated at or switched through central office 100 concerning subscriber lines terminating on concentrator 101 will be transmitted to concentrator 101 via the receive-R path of highway 105 in the various assigned time multiplex channels.

In order to effect the elimination of control leads in the highways, a radical revision in the type and operation of control facilities, both at the concentrators and central office 100, is necessary. It is evident that in order to permit the transmission of all intelligence and control signals between a concentrator and the central office via a single path in each direction forming a common transmission highway including a single pair of wires, the complexities in performing the necessary functions at both terminals will increase. These complexities are held to a minimum in accordance with this disclosure by allocating to the concentrator a minimum amount of the essential control operations. In order to accomplish this, the technique employed herein involves the initiation of all operations in the concentrator only in response to commands received from the central office. In order to realize this objective, the concentrator is arranged so as to perform specific functions:

(1) Each subscriber line terminating on the concentrator is scanned periodically for service requests and disconnects and the results of the scan are forwarded to the central office for processing in a designated control time slot.

(2) A signaling tone inviting a calling subscriber to begin generating the designation of a called subscriber line is transmitted from the central office to the concentrator in a time slot assigned to the calling line.

(3) The designation of a called subscriber line generated at the calling subscriber station will be transmitted to the central office in the time slot assigned to the calling line.

(4) Coded samples of intelligence received from an active subscriber line are transmitted to the central office in the time slot assigned to the active subscriber line. Similarly, coded intelligence samples received from the central office are decoded and transferred to an active subscriber line in the time slot assigned to the active subscriber line.

Since all information developed subsequent to a subscriber line becoming active or off-hook is transmitted between the concentrator and the central office in a time slot assigned to the particular subscriber line, such information may be detected and processed at the central office according to the system disclosed in the aforementioned Inose et al. Patent 3,223,784. However, since the scanning of subscriber lines is performed prior to the assignment of a time slot, i.e., a subscriber station is inactive or on-hook, a control time slot is assigned to perform such signal transmission. Thus, for example, in a twenty time slot repetitive cycle or frame interval, the first eighteen time slots are assigned to active subscriber lines, the nineteenth time slot is assigned to signaling or transfer of control information, and the twentieth time slot is utilized for synchronization.

OFFICE TIMING

In order to assist in an understanding of the detailed operation of this system, the particular system timing will first be considered, and for this purpose a specific timing arrangement, as illustrated in FIG. 9, will be described. In this instance it is assumed that 127 subscriber lines terminate on each concentrator and that twenty time slots $S_1, S_2 \ldots S_{20}$, corresponding to twenty time channels in the associated highway, are available and deemed sufficient to handle the traffic requirements for this capacity. The twenty time slots appear in a repetitive cycle F, referred to as an office cycle or frame. Eighteen of the time slots $S_1-S_{18}$ are reserved for intelligence signals, one time slot $S_{19}$ for control signals, and one time slot $S_{20}$ for framing or synchronizing information which assures that each frame begins at precisely the same time in the concentrator and central office.

The repetition rate of each frame advantageously is chosen as fifty kilocycles per second such that each time slot is one miscrosecond in duration. One binary digit or bit of information may be transmitted in each time slot via a corresponding time channel of the selected highway. For example, with twenty time slots of one microsecond duration in each frame, twenty binary digits or bits of information may be transmitted over the twenty time channels in the send lead of highway 105, FIG. 1, in each twenty microsecond frame interval. In the same frame, twenty bits may be transmitted over the twenty time channels in the receive lead of the same highway.

Figure 3A:
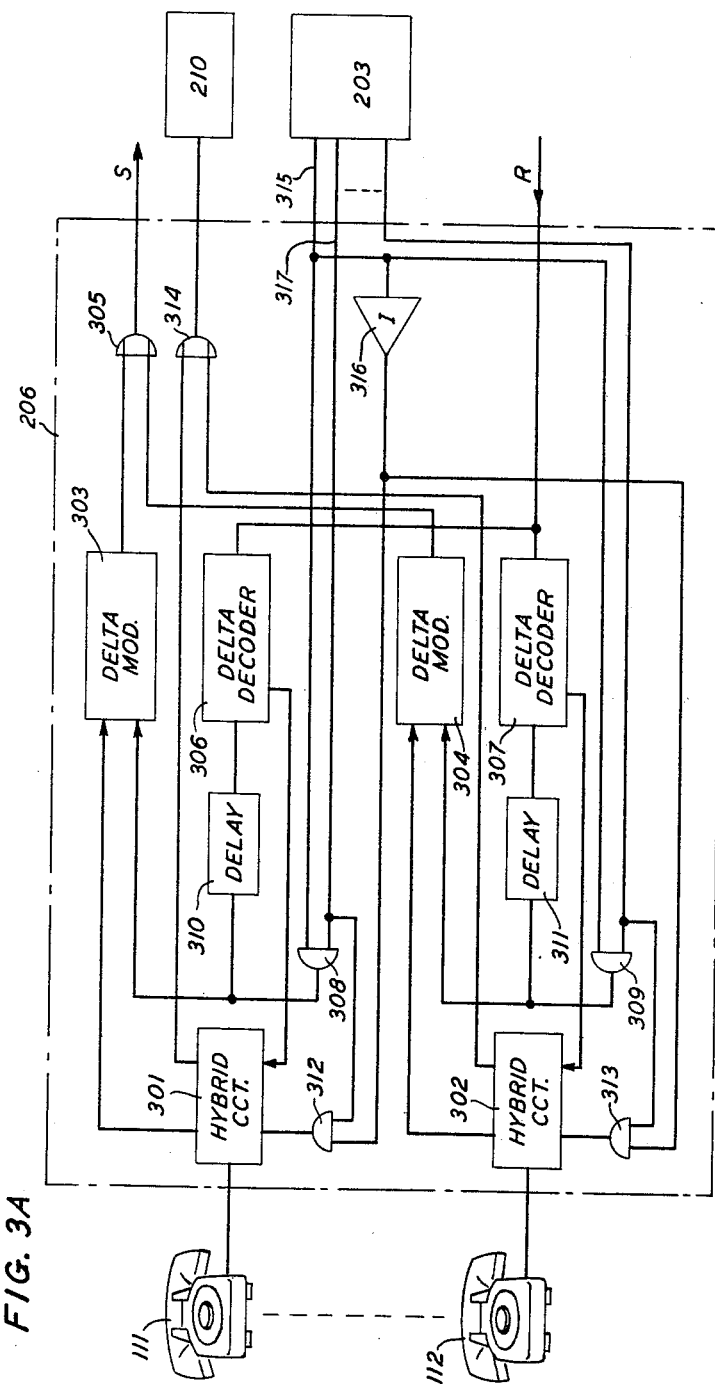
FIG. 3A is a representation in greater detail in the subscriber line circuit in the line concentrator depicted in FIG. 2.

Each time slot is also divided into four phases $\varphi_1-\varphi_4$. Particular control functions are performed by clock signals available during particular phases $\varphi$ of a time slot S in a particular frame F. An operation occurring in frame 1, time slot 18, phase 3 would be designated $F_1S_{18}\varphi_3$. Timing within a frame is established by a common clock pulse source at central office 100, designated clock pulse generator 305 in FIG. 3. This pulse source serves all concentrators and all office control equipment to maintain proper synchronism and to perform all timing operations therein.

As will be considered more fully hereinafter, central office 100 transmits commands periodically to the various line concentrators. One command is formulated and transmitted to a concentrator and an answer is received in the central office during a command cycle of 1.2 milliseconds duration. Each command cycle in turn comprises three memory cycles $M_1$, $M_2$, $M_3$, each memory cycle being of 400 microseconds duration. A memory cycle encompasses twenty frames $F_1-F_{20}$, each frame being of twenty microseconds duration and in turn comprising twenty 1-microsecond time slots $S_1-S_{20}$.

Before describing the operation of the system in detail, it may be of assistance to consider the major components illustrated in block form in FIG. 2 and how they are related.

LINE CONCENTRATOR

At each stage in the progress of establishment of a call connection, a command is transmitted to the concentrator through which the call is originated and this concentrator, in turn, responds with an answer command to the central office. The particular operations performed in the concentrator in response to these commands will now be considered. A command is received via the receive-R path of highway 105, FIG. 2, in command receiver 201 of concentrator 101. The portion of this command which provides the subscriber line designation and call progress designation is compared with the corresponding content of remote memory 203 in remote control 202. If discrepancies are noted between the command and the content of remote memory 203, or if a parity check reveals a transmission error, the command will not be executed. Instead, a signal will be sent to answer generator 205 serving to generate a particular answer command indicating this condition. The central office will respond to receipt of this answer command by transmitting a corrective command. If the comparison in remote control 202 does not reveal any discrepancy in the information stored in remote memory 203, the command will be executed and the answer generator 205 will be requested to transmit a different response to the central office indicating the successful execution of the command.

Remote memory 203 comprises a group of delay lines, each having a twenty microsecond delay. In this example a seven bit code designating one of the subscriber lines terminating on concentrator 101 plus a single bit code designating the call progress for that line will appear at the output of remote memory 203 during each time slot. A seven bit code, of course, will permit storage of 128 distinct numbers. Thus in this instance concentrator 101 may terminate 127 subscriber lines, the code 0000000 being reserved to indicate an idle time slot.

Scanning of subscriber lines is initiated by a distinct command from the central office which serves to store a call progress indication corresponding to a particular subscriber line designation in remote memory 203. As noted in FIG. 3A, subscriber line circuit 206 comprises the usual hybrid circuit 301 for transfer of information between the two-wire subscriber line connecting station 111 to subscriber line circuit 206 and the four-wire highway 105. The scanning circuit 210 is connected to hybrid circuit 301 through AND gate 312 in order to detect the line loop condition corresponding to subscriber station 111. A translation of the subscriber line number contained in remote memory 203 will provide the input to AND gate 312 via lead 317, and the other input via lead 315 and inverter 316 will be provided by the call progress designation corresponding to the scan request. Thus if both signals are present, AND gate 312 will be enabled and the line loop condition in hybrid circuit 301 will be reflected by a signal transmitted through OR gate 314 to scan circuit 210.

If the scan signal occurs in the control time slot and subscriber station 111 was previously on-hook and is now off-hook, an appropriate answer command will be transmited from answer generator 205 to central office 100 indicating that a new request for service has been received. Similarly, if in the control time slot subscriber station 111 was previously off-hook and is now on-hook, an appropriate answer command will be transmitted from answer generator 205 indicating that a call disconnect has been detected. If the scan signal occurs in the time slot assigned to subscriber station 111, the signals produced by the changes detected in the subscriber line loop correspond to the designation of a called subscriber line and are detected at the central office in the same fashion as intelligence signal samples, as described in detail in the aforementioned Inose et al. Patent 3,223,784.

If the opposite call progress indication is present on lead 320 at the output of remote memory 203 at the time this subscriber line designation appears at the output of remote memory 203, AND gate 308 will be enabled instead of AND gate 312. In this instance delta modulator 303 will code an intelligence sample received from subscriber station 111 through hybrid circuit 301, and the coded sample will be transmitted through OR gate 305 and over the send path of highway 105 to central office 100 in the particular time slot assigned to subscriber station 111. After a delay determined by delay device 310, delta decoder 306 will produce an analog sample from the coded signal received in the corresponding time slot from central office 100 on the receive lead of highway 105. This analog sample, which corresponds to an intelligence sample formed at the called subscriber station, will be delivered through hybrid circuit 301 to calling subscriber station 111.

It is necessary, therefore, to provide only two call progress designations at the concentrator; one to permit scanning and the other to permit coding and decoding of intelligence signal samples. In this fashion the memory requirements at the concentrator are simplified to the extent that a single remote memory 203 satisfies all of the memory requirements and, of course, the chances for errors are correspondingly reduced.

CENTRAL OFFICE SWITCHING NETWORK

Central office 100 includes a switching network capable of interconnecting telephone lines terminating on the same line concentrator, on two different line concentrators, and on one line concentrator and a foreign office. The send and receive paths of each highway, such as 105, terminate on switches designated junctor pairs in switching network and control 220, which switches in turn are interconnected through delay devices designated pulse shifters which serve to shift information received from a calling line in one time slot to a called line in a second time slot.

For example, assume that calling subscriber station 111 in concentrator 101 is connected to a called subscriber station in another concentrator and that because of traffic problems, different time slots had to be assigned to each of the two stations. A signal sample from station 111 is received in switching network 220 via the send-S lead of highway 105 in time slot A, assigned to the calling line connecting station 111 to concentrator 101, and is switched at crosspoint 321, FIG. 3B, so as to pass through pulse shifter 322 where it is delayed until the appearance of time slot B, assigned to the called subscriber station in the other concentrator. At this time the signal sample is transmitted through junctor crosspoint 323 and over the receive-R path of the particular highway connecting central office 100 to the other concentrator. Similarly, intelligence signals from the called station arrive in central office 100 on the send-S path of the corresponding highway in time slot B and are switched through junctor crosspoint 324 to pulse shifter 325 where they are delayed so as to appear at junctor crosspoint 326 in time slot A for transmission to concentrator 101 via the receive-R path of highway 105.

Operation of the junctors is under control of junctor gate memories such as 327 and 328 and, similarly, the pulse shifters 322 and 325 operate under control of pulse shifter memory 329. All of the foregoing junctor switching and pulse shifting operations to realize the desired time slot interchange are now well known in the art, being disclosed, for example, in an article entitled "Time Slot Interchange in Time Division Electronic Exchanges" by Hiroshi Inose, appearing in the Journal of the Faculty of Engineering, University of Tokyo (B), volume XXVIII, No. 2 (1965).

CENTRAL OFFICE CONTROL

Figure 3B:
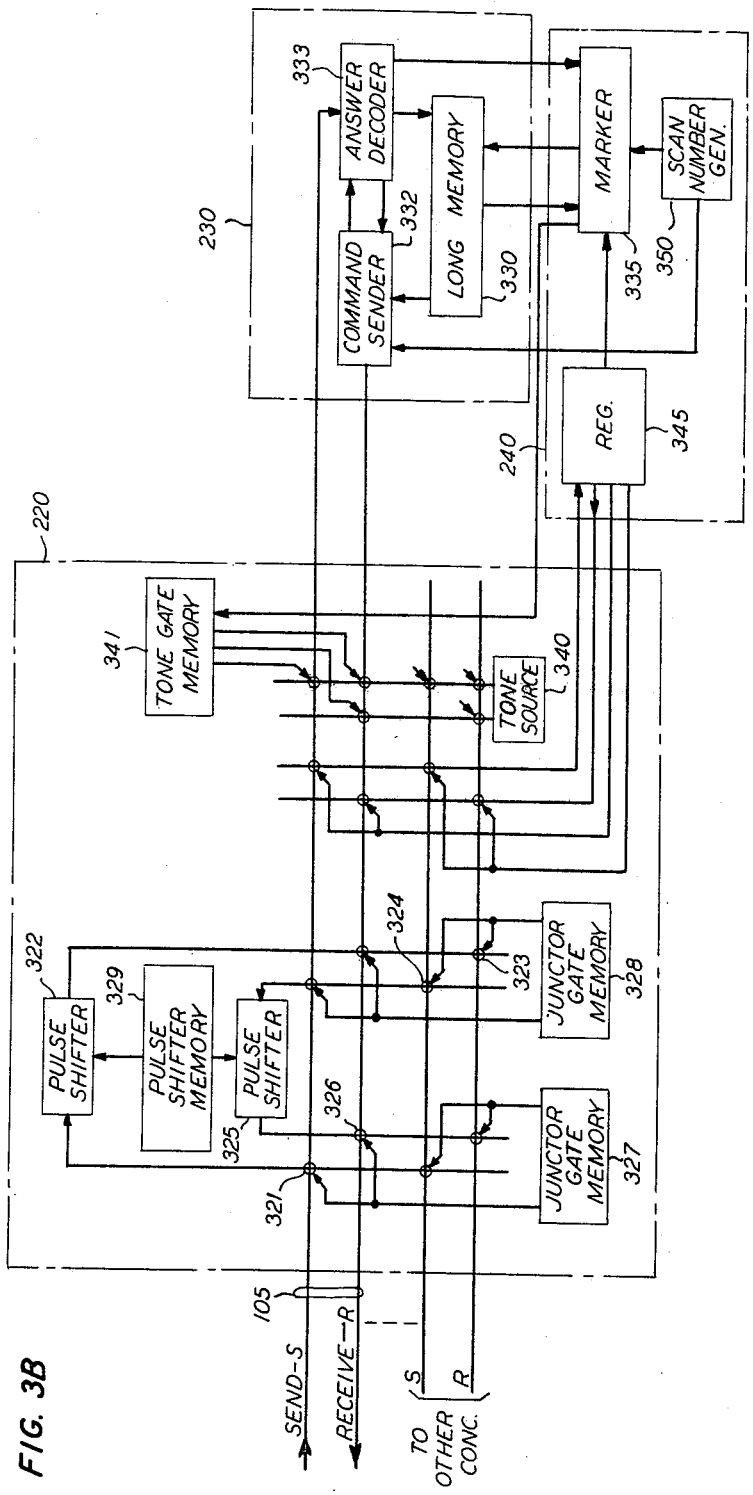
FIG. 3B is a representation in greater detail of particular facilities at the central office depicted in FIG. 2.

The basic control elements at central office 100 necessary for this disclosure are shown in block form in FIG. 2 and in more detail in FIG. 3B. The control elements which are common to all concentrators include clock pulse generator 260 and power supply 250, the operations of which are suggested by their designations, and common control 240 which contains the control elements of particular interest to this disclosure. In addition, certain control elements are associated with a single line concentrator and are indicated in FIG. 2 as concentrator control 230–233.

The elements in switching network and control 220, concentrator control 230, which corresponds to concentrator 101, and elements in common control 240, are depicted in FIG. 3B. Long memory 330 maintains a record of all active telephone lines terminating on a particular concentrator and of the activity condition or call progress of each time slot in the concentrator. As will be noted hereinafter, a single long delay line satisfies the storage requirements of both the line numbers and call progress indications. In this particular embodiment, twenty memory bits are allotted to every time slot for storage of a line number and a call progress indication. The bits stored in each twenty bit interval are illustrated in FIG. 10. Thus with twenty time slots available, long delay line 330 will have a length of 400 bits, i.e., twenty messages of twenty bits each, which are circulated in serial fashion to provide a continuous activity record for the corresponding remote concentrator 101.

The information necessary to formulate commands is stored in long memory 330 in a distributed serial form. As illustrated in FIG. 10, this stored information comprises twenty bits, each of which is stored in the corresponding time slot position in successive frames $F_1$–$F_{20}$. Thus, for example, the information which is utilized to formulate commands affecting time slot five ($S_5$) and the corresponding fifth time channel in the send (S) and receive (R) paths of highway 105, will be found in $F_1S_5$, $F_2S_5$, $F_3S_5$ . . . $F_{20}S_5$ of long memory 330. Each of the four hundred bits stored in long memory 330, i.e., twenty frames of twenty bits each, will be retrieved once in each memory cycle. Thus all of the bits affecting one time slot, being distributed over the twenty frames, also will require a complete memory cycle for retrieval. One advantage derived from this distributed serial storage is that particular information concerning all of the time slots will be retrieved in the same frame interval. For example, the occupation bit contained in each time slot in $F_{12}$, FIG. 10, indicates whether or not a subscriber line in the corresponding remote concentrator has been assigned to each of the time slots. Thus in the twenty time slot interval in which the information stored in frame $F_{12}$ is retrieved, the availability of all of the time channels in the highway to that concentrator will be known.

Command sender 332 is also provided on a per concentrator basis and, as its name implies, it serves to transmit commands it formulates from information provided by long memory 330 to the corresponding concentrator 101. The response from the concentrator received in central office 100 via the send lead of the corresponding highway 105 is decoded in answer decoder 333 and applied to long memory 330 if the call progress is to be advanced, or to marker 335 if there is a new request for service or disconnect.

Appropriate tones for system operation, such as ringing tone, ringback tone, and busy tone are generated at tone source 340 and transmitted through tone gates in the switching network, as determined by tone gate memory 341.

Register 345 operates gates in the switching network at the appropriate time to receive and register dial information from subscriber lines. It also supplies dial tone to the system, as required. Register 345 in this embodiment operates on a time division basis and has the capability of processing eighteen calls simultaneously. For this purpose register 345 includes a dial progress memory, to be discussed hereinafter, which stores information pertaining to each subscriber line currently connected to register 345 and controls the subsequent operation of the register. Thus in this embodiment, one register is sufficient to satisfy the requirements of the system.

Marker 335 controls the interaction of all of the other control devices in central office 100 so as to establish telephone connections one at a time. Its services are requested on a preferential basis by the answer decoders, such as 333, corresponding to each concentrator, and by register 345. A preference circuit is included in marker 335 to prevent the occurrence of a racing condition. Also included in central office 100 is scan number generator 350, which comprises components well known in the art and the operation of which is implied by its name.

COMMANDS

Since the majority of the control equipment is located in the central office, increased precautions must be taken to guard against the occurrence of errors in transmission of commands from the central office, execution of commands at the remote concentrator, and formulation of answer commands transmitted to the central office. A further reduction in control facilities required at the remote concentrator is realized in accordance with this disclosure by eliminating all error detection and correction circuitry therefrom. Thus the only means for correcting errors in the receipt or execution of commands is via the the answer command transmitted to the central office. Any errors detected at the remote concentrator are corrected at the central office by the next command transmitted to the remote concentrator.

In order to appreciate this error correction capability solely through the use of commands and answer commands, it is necessary first to understand the particular commands and answer commands utilized in this system. The composition of a typical command is shown in FIG. 11. As noted therein, the essentials of the command comprise the seven binary digits or bits necessary to identify the line number which will be affected by this command. The line number code is followed by the reduced call progress code, which is a single bit indicating whether the corresponding line is to be scanned or whether an intelligence sample from the corresponding subscriber station is to be coded for transmission. The reduced call progress code in turn is followed by a parity bit and a separation bit, the latter of which is always "0." The separation bit is followed by the five bit designation of the time slot in which this command is to be executed, five digits being required to designate one of the twenty time slots in a frame. A second parity bit and separation bit follow the time slot designation and precede the three bit order code which this particular command will execute in the designated time slot. The three bit order code, in turn, is followed by a parity bit and a final separation bit. Thus an entire command is twenty-two bits in length, and since a command is transmitted one bit at a time in the nineteenth or control time slot of each successive frame, a single command will require twenty-two frames for transmission to a concentrator.

The system requires only seven commands for its operation. The first command is to scan an idle subscriber line. This command, of course, detects a new request for service at the designated subscriber line in the nineteenth or control time slot. It also determines whether any information is stored in remote memory 203 which is not contained in the corresponding memory at the central office. If the number of the particular subscriber line designated by the "scan for service request" command is not found in remote memory 203 and if the call progress code specified for the control time slot requests a scan of the subscriber line loop, the subscriber line designation will be written in the control time slot in remote memory 203, and the subscriber line loop condition will be determined.

The second command is to scan a subscriber line which was previously active on a call connection. This command will detect the disconnection of an active subscriber line. In this instance the line number contained in the "scan for disconnect" command will be compared with all line numbers stored in remote memory 203. If it is found therein and the call progress code for the time slot specified in the command requires a scan of the subscriber line loop, the corresponding subscriber line number will be stored in the control time slot in remote memory 203 and the subscriber line loop will be scanned.

The third command verifies that the designation of an active subscriber line is, in fact, stored in the appropriate time slot in remote memory 203. The "verify" command is transmitted from the central office alternately with the "scan for disconnect" command.

The fourth command is to store a specified subscriber line number in remote memory 203 in a specified time slot. Prior to the execution of this "store" command, comparisons are made in remote control 203 to assure that the specified subscriber line number is not already stored in remote memory 203 and that the specified time slot in remote memory 203 is empty.

The fifth or "erase" command orders that a specified subscriber line number be erased from a specified time slot if, in fact, it as found that the specified line number is stored in the specified time slot.

The sixth or "change call progress" command changes the call progress indication for a specified line number as contained in remote memory 203 in a specified time slot if, in fact, the specified call progress indication differs from the currently stored call progress indication.

Finally, the seventh or "erase and store" command is to store a specified subscriber line number in remote memory 203 in a specified time slot regardless of any discrepancies between the current content of remote memory 203 and the command. If the specified line number is stored at any time slot other than the specified time slot, it is erased therefrom prior to its storage in the specified time slot.

Only three answer commands are needed to respond to the seven commands received from the central office. The first answer command indicates that a command has been executed and that the central office may proceed to the next call progress state. The code adopted for this answer command is 1111 . . . 11.

The second answer command indicates that a command was incorrect for some reason, so that the current call progress state should be maintained and the same command retransmitted. The code for this answer command is 0000 . . . 00.

The third answer command indicates a discrepancy between a command and the content of remote memory 203 such that the central office should now transmit the seventh or "erase and store" command which will serve to alter the content of remote memory 203. The code for this answer command is 1010 . . . 10.

Adoption of these three codes for the answer commands conforms to the signaling employed in the aforementioned Inose et al. Patent 3,223,784; for example, the 1010 . . . 10 code in that system identifies an active or off-hook subscriber line from which no intelligence signal is currently being received and for which no action need be taken. Thus in the present system the control equipment at the central office which serves to detect intelligence and called line designations in a time slot assigned to a particular subscriber line will not be confused by receipt of this code in the assigned time slot.

COMMAND SENDER

Figure 8:
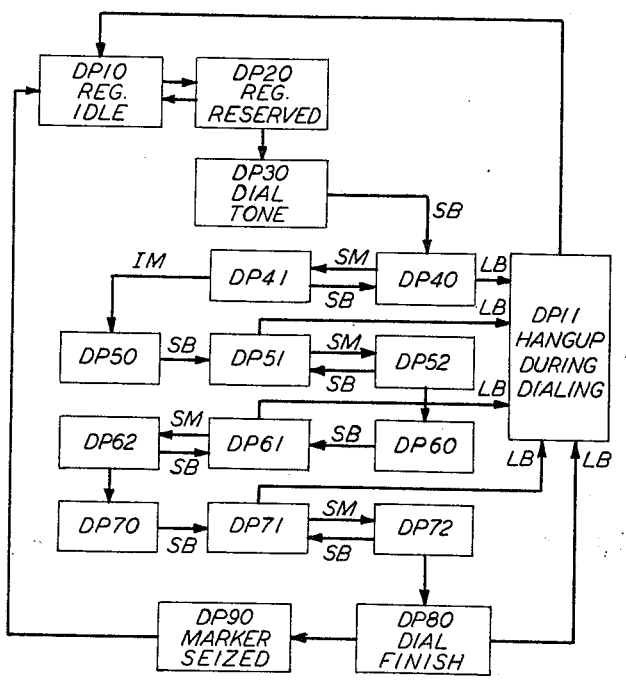
FIG. 8 is a flow chart depicting the sequence of operations followed in the registration of a called line designation by a calling line and termed the dail progress DP.

As indicated, the system is dependent for its operation upon commands formulated in central office 100 and made available to the proper line concentrator in the nineteenth time slot. Command sender 332, FIG. 3B, is responsible for transmitting all commands to line concentrator 101 with which it is associated. It receives requests for commands from long memory 330, from answer decoder 333 and from scan number generator 350. It then proceeds, according to the priority of the requests, to formulate the appropriate commands for transmission to the corresponding concentrator in the nineteenth time slot. Each distinct command is requested, formulated and transmitted during a command cycle $M_1M_2M_3$ of 1.2 milliseconds duration, FIG. 8. The composition and operation of command sender 332 will now be considered in greater detail with reference to FIGS. 3, 4, 9 and 10.

Command sender 332 consists of a short memory 401, advantageously a circulating delay line or shift register capable of storing twenty bits, each of which appears at the output once in each frame interval of twenty microseconds. Thus each bit corresponds to a time slot, and the twenty bits in the memory correspond to the twenty time slots in a frame interval. Such an arrangement is necessary so that comand sender 332 may observe long memory 330 for an entire twenty frame interval in order to derive the information concerned with an operation in a particular time slot. This is true inasmuch as each bit of the message corresponding to a given time slot is contained in a distinct frame, the entire twenty bits of the message being stored in long memory 330 so as to be distributed over the entire twenty frame interval or memory cycle, FIG. 10, as indicated hereinbefore.

In addition to short memory 401, comand sender 332 comprises a sender controller 402 which is simply a group of logic gates for directing information from various sources under control of short memory 401 and various timing signals. Counter 403 is a shift register which serves to provide each time slot number in coded form corresponding to the particular output of short memory 401. Switching circuit 404 consists of logic gates well known in the art which gate information from long memory 330 under control of short memory 401.

Call progress word storage 405, as its name implies, includes a register in which the call progress word received from long memory 330 is stored. Code converter 406 converts the call progress word contained in storage 405 to a particular coded form as required in the outgoing command, and transmits the coded order word to order storage 407. Subsequently, in conjunction with particular timing signals, the order, as well as other outgoing information, is transmitted through OR gate 408 to buffer storage 412.

Write-erase control 409 comprises logic circuitry which determines from its inputs what information will be stored in short memory 401 in particular time slots. Cross correlator 410 comprises logic circuitry which serves to compare the content of long memory 330 with the distinct line number generated in each scan cycle by scan number generator 350. The composition and operation of cross correlator 410 and write-erase control 409 will be considered in greater detail hereinafter with reference to FIG. 6.

Parity control 411, as its name implies, checks the parity for the particular line number and call progress words currently being transmitted. Finally, buffer storage 412 comprises a shift register which provides an interface between central office 100 and highway 105 to the corresponding concentrator 101 such that commands will be transmitted at the appropriate time in each office cycle.

The seven commands utilized by the system have four priority levels. The highest priority command is "erase and store," which is derived from the concentrator's response to a command from central office 100, indicating that some discrepancy has been found which makes it impossible to carry out the command at the concentrator. Such a directive will be supplied by answer decoder 333 and transmitted through write-erase control 409 so as to store a "1" in the appropriate time slot of short memory 401. The appearance of the stored "1" at the output of short memory 401 during the $M_3$ memory cycle, FIG. 9, will result in sender controller 402 providing the appropriate highest priority command to buffer storage 312, which command will include the designation of the time slot as provided by counter 403.

If the highest priority command is not called for in the preceding command cycle, the necessity for transmitting the second priority command will be investigated at $M_1F_1$. A request for the second priority command will be indicated by the presence in long memory 330 of a "1" in one of the twenty time slots in the first frame $F_1$, FIG. 10. It will be formulated in similar fashion to the first priority command. The second priority command, if present, will serve to erase the specified line number from the specified time slot as stored in remote memory 203 of concentrator 101.

If there is no "1" stored in long memory 330 in the twenty time slots comprising frame $F_1$, command sender 332 will now begin observing the condition of the twenty time slots in $M_1F_2$ which contain indications of third priority commands. Such commands require the writing of a specified line number in a specified time slot of remote memory 203 and the changing of the call progress state as stored in a specified time slot of remote memory 203. Again the first "1" discovered in long memory 330 will determine the time slot for which the third priority command will be sent, i.e., the time slot in which the third priority command will be executed. For this purpose, the first "1" found in long memory 330 during frame $F_2$ will be stored in short memory 301 after passage through cross correlator 410. At the end of frame $F_2$ if a "1" is contained in short memory 401, the information stored in the long memory in the corresponding time slot will be read out in each appearance of that time slot in succeeding frames of memory cycle $M_1$. In this manner the information identifying a line number stored in long memory 330 is gated through switching circuit 404 to buffer storage 412 via OR gate 408 in successive frame intervals $F_3$–$F_9$.

Similarly, on the appearance of the "1" at the output of short memory 401 in frame $F_{10}$, the reduced call progress word bit contained in long memory 330 in the corresponding time slot of $F_{10}$ will be gated to buffer storage 412, and in $F_{11}$ the parity bit contained in the corresponding time slot in long memory 330 will be retrieved and stored in buffer storage 412. In this fashion the portion of a command identifying a line number and a call progress bit is made available for transmission a bit at a time to concentrator 101 in successive appearances of the nineteenth time slot in each office cycle. At $M_1F_{12}$ a "0" is added to the command in buffer storage 412 indicating that the first portion of the command has been completed. This action is triggered by the content of long memory 330 in the corresponding time slot of frame $F_{12}$.

During the foregoing operations the time slot number corresponding to the position in short memory 401 containing the "1" is developed in counter 403, coded and transmitted to buffer storage 412 via OR gate 408 from $M_1F_{13}$ through $M_1F_{17}$, the readout being triggered by the occupation bit in the corresponding time slot of $F_{12}$, as contained in long memory 330. The appropriate parity bit for the coded time slot number is generated by parity control 411 and sent to buffer storage 412 in $M_1F_{18}$. Another "0" is added to the command stored in buffer storage 412 at $M_1F_{19}$, indicating the end of the second portion of the command, viz., the identity of the time slot involving the previously stored line number and call progress word and the subsequently stored command.

It may be noted in FIG. 10 that the call progress word is stored in the corresponding time slot in $F_{13}$–$F_{16}$ in long memory 330. Thus while the time slot number is being stored in buffer storage 412, the call progress word is read out of long memory 330 in the same interval and is stored in call progress word storage 405. At $M_1F_{17}$ the call progress word is converted to an order code in code converter 406 and stored in order storage 407. After this delay for proper coding of the call progress word into an order, the coded order is now available for storage in buffer storage 412 via OR gate 408 from $M_1F_{20}$ to $M_2F_2$. Thereafter, the parity bit of the order code which appears in the corresponding time slot in $F_{17}$ in long memory 330 will be transmitted to buffer storage 412 in $M_2F_3$ to complete the third priority command.

If no command with higher priority has been detected upon the completion of $M_1F_2$, the fourth or lowest priority command, which is to scan telephone lines, is formulated and transmitted. The line number for the lowest priority command is generated in scan number generator 350 during each command cycle. Thus with 127 lines terminating on concentrator 101, scan number generator 350 will provide a different line number once in each 127 command cycles. The first bit of the line number is transmitted from scan number generator 350 to cross correlator 410 in command sender 332 at $M_1F_3$ and if, in fact, the lowest priority command is to be transmitted by command sender 332, the balance of the line number will be provided in $M_1F_4$–$M_1F_9$.

During each of these frames cross correlator 410 conducts a comparison of the available bit of the generated number with the line number stored in each corresponding time slot in long memory 330. The cross correlation operation may be understood by reference to FIG. 6. As noted therein, cross correlator 410 comprises flip-flops 605 and 606, AND gates 601–604, 607 and 610, OR gates 609 and 612, and inhibit gates 608 and 611. If there is no higher priority command being generated, as reflected by a signal from sender controller 402 at $M_1F_3S_1\varphi_1$, flip-flop 605 will be set. With flip-flop 605 in the set state, AND gates 607 and 608 are enabled to pass the first bit of the line number currently being generated in scan number generator 350 if it is matched with the first bit of the line number stored in long memory 330. Thus an output is provided through OR gate 609 in the time slot in which a comparison is obtained. This output is transmitted through AND gate 610 and OR gate 612 for storage in short memory 401 in the corresponding time slot. In this fashion, if the bits stored in each time slot of frame $F_3$ in long memory 330 match the bit provided by scan number generator 350, a "1" will be stored in the corresponding time slots of short memory 401.

At the beginning of the next frame $F_4$, i.e., $R_4S_1\varphi_1$, AND gate 604 will be enabled and its output will set flip-flop 606 so as to remove the inhibit input from inhibit gate 611. The other inputs to inhibit gate 611 are the output of short memory 401 and the comparison output through OR gate 609. Thus comparisons conducted in each time slot $S_1$–$S_{20}$ in frame $F_4$, resulting in a match between the content of long memory 330 and the current output of scan number generator 350, will provide one input to inhibit gate 611. Concurrently, short memory 401 feeds back its content serially to another input to inhibit gate 611. In this instance if the comparison output is a "1" in any time slot in frame $F_4$ and it matches the "1" in the corresponding time slot of short memory 401, placed there during the preceding frame, inhibit gate 611 will provide a "1" output which will be transmitted through OR gate 612 and rewritten in short memory 401 in the same time slot. This same matching and storage operation will continue through frames $F_4$–$F_9$ such that at the end of frame $F_9$, a "1" will remain in short memory 401 only if the complete line number provided by scan number generator 350 has, in fact, matched a line number contained in long memory 330. This "1" will, of course, be found in a position corresponding to the time slot which the line number occupied in long memory 330.

At $F_9S_{20}\varphi_1$, which marks the end of the line number storage in long memory 330, AND gate 603 is enabled to reset both flip-flops 605 and 606, thereby inhibiting further operation of cross correlator 410. In the next time slot, viz, $F_{10}S_1\varphi_1$, AND gate 613 in write-erase control 409 is enabled to set flip-flop 614, thereby removing the inhibit input to inhibit gate 615. Thus a feedback path for short memory 401 is provided through inhibit gate 615 and OR gate 612 so as to preserve and circulate the current content of short memory 401.

Figure 4:
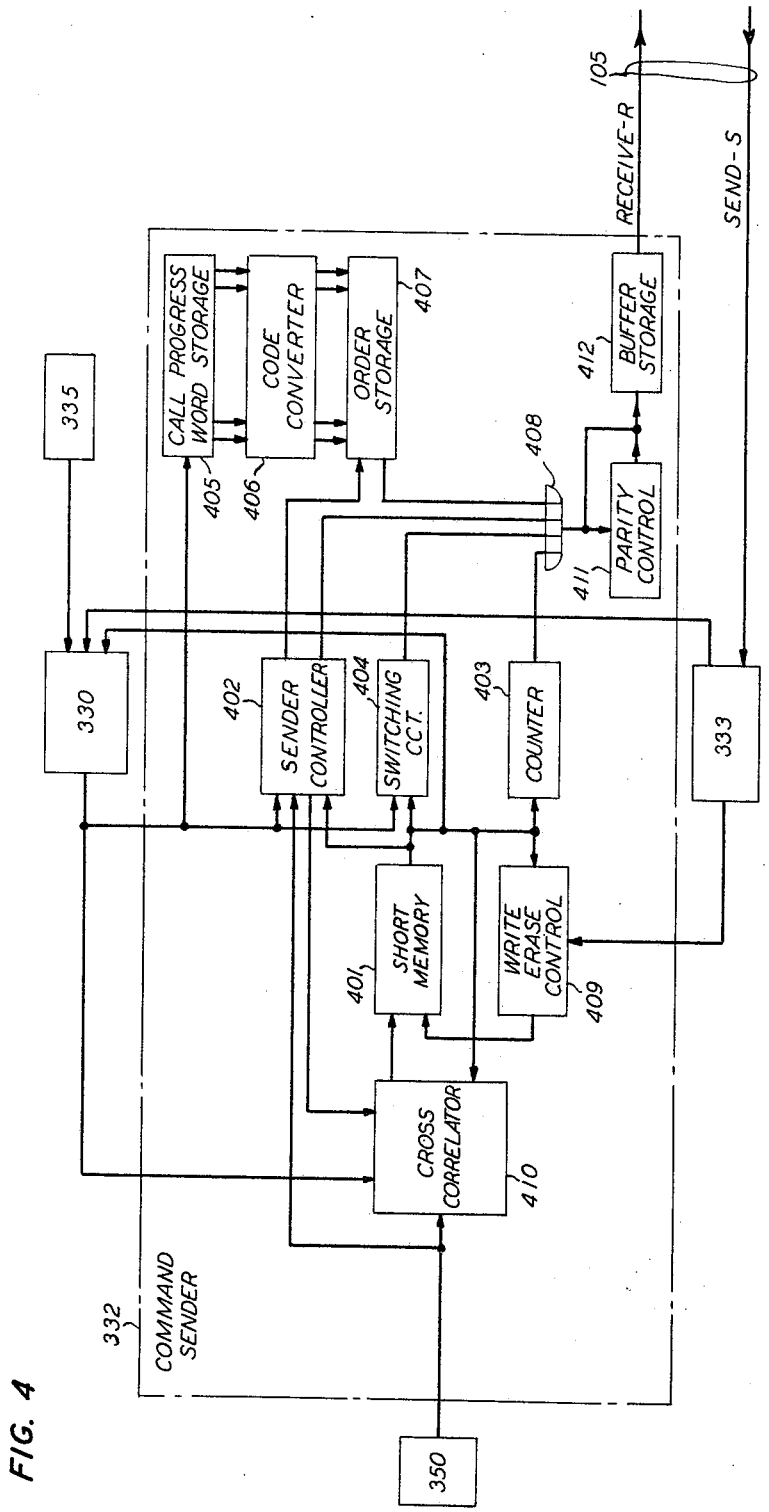
FIG. 4 is a block diagram representation of the command sender depicted in FIG. 3B.

Concurrent with the operation of cross correlator 410, scan number generator 350 transmits the line number under comparison through sender controller 402, FIG. 4, and OR gate 408 to buffer storage 412 so that the line number will be sent to concentrator 101 to conduct a scan of the designated line regardless of the outcome of the comparison in cross correlator 410. If a "1" remains in short memory 401 upon completion of the cross correlation, it indicates that the subscriber line being scanned is already active in the particular time slot designated by the position of the "1" in short memory 401. In this event, it is necessary to transmit the "verify" command to concentrator 101 to verify that the subscriber line number is, in fact, written in remote memory 203 in the correct time slot and the "scan for disconnect" command which serves to scan the indicated active subscriber line, in this instance to detect a termination. Scan number generator 350 determines which of these commands will be transmitted in a given command cycle. It does so by generating a unique order code for each of the two commands in alternate command cycles.

If the "verify" command is designated, the reduced call progress word stored in $F_{10}$, FIG. 10, is retrieved from long memory 330 by virtue of the "1" stored in short memory 401 in the corresponding time slot. Also the time slot number is formulated in counter 403 in the manner previously described. The particular order code for the "verify" command is transmitted from scan number generator 350 to order storage 407. All of the foregoing information required to formulate the command then is placed in buffer storage 312 in the usual manner and the complete command is transmitted to concentrator 101 a bit at a time in the nineteenth time slot.

In the command cycle in which the "scan for disconnect" command is to be transmitted, the operations are the same with the exception that the time slot number is transmitted from scan number generator 350 to counter 403 rather than having this number developed by counter 403 from the content of short memory 401, as is true for all other commands.

If the command has been executed so that the call progress may advance to the next state, the corresponding answer command from concentrator 101 is decoded by answer decoder 333, and appropriate signals are transmitted therefrom which serve to retain the "1" stored in the corresponding time slot of short memory 401. Also the priority bit as contained in long memory 330 is erased, and the parity bit is adjusted. Thus the various control components at central office 100 are in a position to advance the call progress in the corresponding time slot to the succeeding state.

If the answer command from concentrator 101 indicates that an erroneus command was received and could not be executed, the action taken by answer decoder 333 will be of a form which permits the same command to be transmitted in the next command cycle. For this purpose the "1" in the corresponding time slot of short memory 401 is erased by a signal from answer decoder 333 resetting flip-flop 614 in the portion of write-erase control 409 illustrated in FIG. 6. The priority bit registered in the corresponding time slot of long memory 330 is retained in this instance such that in the next command cycle the same command will be formulated and transmitted.

Finally, if the answer command from concentrator 101 indicates that the content of the command received from central office 100 does not match the corresponding content of remote memory 203, answer decoder 333 will take action calculated to result in the transmission of a command in the next command cycle which will write the line number designated by the command in the specified time slot in remote memory 203 regardless of the current content thereof. For this purpose the "1" is retained in the corresponding time slot of short memory 401 such that in the next commond cycle the time slot number for the corresponding time slot is generated by counter 403 and the appropriate order code for the command is transmitted from answer decoder 333 directly to order storage 407 from which it is subsequently transmitted to buffer storage 412 and, finally, to concentrator 101 in the usual manner.

Operations conducted in memory cycle $M_2$ of the command cycle include the selective seizure of marker 325 by one of the answer decoders 333 and the storage of information in long memory 330 by marker 335. Changes in the information stored in long memory 330 instigated by answer decoder 333 are conducted during memory cycle $M_3$ of the command cycle.

THE MARKER

Marker 335, FIG. 5, as indicated previously, serves to process one call at a time upon request from any one of the concentrators on a selective basis. In the processing of a call, the services of the marker are required at three different times to perform three distinct operations. First the marker is seized upon receipt by answer decoder 333 of a new request for service and the service performed by the marker at this time is to assign a time slot to the calling line, which time slot is commonly idle in the highway of the originating concentrator and in register 345. Having determined this time slot, the information identifying the calling line, the particular call progress state and the other information necessary to the further processing of this call is written in long memory 330 by marker 335 in the corresponding assigned time slot.

These operations may be followed by reference to the block diagram of the marker illustrated in FIG. 5 and particularly in regard to calls involving concentrator 101. Originating concentrator storage 501 is arranged to receive and store the call progress state and the identity of concentrator 101, through which the request for service is received, as determined by the corresponding answer decoder 333, to which originating concentrator storage 501 is connected at this time. The intermediate selection circuitry for establishing the call connection which the marker is handling at a particular time is not illustrated. This transfer and storage occurs at the end of the second memory cycle $M_2$ in a command cycle.

At the same time that the concentrator identity is stored in originating concentrator storage 501, the identity of the calling line is received in originating line number storage 503 from scan number generator 350, which number is cyclically available therein at the time the request from the calling line is received. At $M_3F_{12}$ the content of the occupation bit position in long memory 330 is transferred to delay 514 through selector 511. A time slot which contains a "0" in the occupation bit position indicates that it is available for assignment to the line requesting service.

After $M_3F_{13}$ the content of delay 514 is compared with the content of each time slot stored in register 345. This comparison is performed in matching circuit 518. Since a "0" stored in delay 514 at this time indicates an idle time channel in highway 105, and a "0" stored in register 345 indicates an idle register time slot, the first "0" match in matching circuit 518 will result in the identity of the corresponding time slot being registered in counter 516.

During the next $M_2$ memory cycle, the content of counter 516 serves to enable time slot marker 506 in the corresponding time slot so as to gate the content of originating concentrator storage 501 and originating line number storage 503 into appropriate positions in long memory 330 corresponding to concentrator 101 serving the calling line. Upon completion of this transfer, the calling line number and new call progress word are available in long memory 330 in the assigned time slot. Concurrently, the dial progress state of this time slot, as recorded in the dial pulse memory of register 345, is changed from idle to reserved. At this point marker 355 is released.

The second operation involving the marker is initiated after the called line designation is stored in register 345. At this time the bid for the marker's services is received from register 345 and, if idle, the marker is seized in memory cycle $M_1$ of a command cycle. The number of the called line is transferred from register 345 to terminating concentrator storage 502 and terminating line number storage 504 between $M_2F_3$ and $M_2F_9$. Concurrently, the long memory corresponding to the terminating concentrator is enabled to transmit the line numbers stored therein to cross correlator 509 through selector 525.

This information is utilized in cross correlator 509, operating in conjunction with delay 515, to determine whether or not the called line, the designation of which is received from storage 504, is busy and, if so, to transmit busy tone to the calling line by operation of tone gate memory 341. This result will be achieved in the manner described hereinbefore in regard to cross correlator 410 in command sender 332 if at the end of $M_2F_9$ delay 515 contains a "1."

If a "1" is not present in delay 515 at $M_2F_9$, the called line is identified to be idle. In this event, the occupation bits from the long memories, corresponding to both originating and terminating concentrators, are transferred to delays 514 and 515, respectively, through the corresponding selectors 511 and 525 during $M_3F_{12}$. In this fashion the idle time channels in the highways of the originating and terminating concentrators are stored in marker 335. This information is compared with the occupation state of each junctor of the switching network 22 to determine common idle time slots. The junctors are assigned and operate in pairs. Thus a junctor pair is selected at random by marker controller 500 and its designation registered in junctor number storage 505. We will assume that the selected junctor pair is served by junctor gate memories 327 and 328. FIG. 3. A comparison operation is first conducted to detect a common idle time slot on the primary side of a first one of the selected junctor pair and in the highway serving the originating concentrator. This time slot matching is conducted in matching circuit 519 beginning with the time slot assigned to the calling line. The simultaneous presence of "0" from both delay 514 and junctor gate memory 327, which it is assumed stores the time slot indications for the primary side of the first junctor, will indicate that such a match is present, and the corresponding time slot designation will be stored in counter 516.

If such a match is successful, matching adjust circuit 521 initiates a similar operation in matching circuit 520 to determine a common idle time slot on the secondary side of the first junctor in the selected pair and in the highway serving the terminating concentrator. In this instance the "0" from delay 515 is matched with a "0" from junctor gate memory 328. If the match is successful in this instance, the resultant time slot designation will be registered in counter 517. If a match cannot be achieved, another junctor pair is selected and the operation repeated. Advantageously, the comparisons involving the primary and secondary sides of the junctors are conducted independently.

Once having located idle time slots for use by the calling and called lines, the corresponding time slot designations will be transmitted from counters 516 and 517 to subtractor adder 512 where the sum and difference between the two designations will be determined. These results are transmitted through counter 513 and time slot marker 508, together with designations contained in junctor number storage 505, to the appropriate pulse shifter memory 329 so as to implement the desired time slot interchange for intelligence signal transmission between calling and called lines via the selected junctor pair. The marker 508 and register 345 are then released.

The final operation involving marker 335 occurs when the originating or calling subscriber disconnects and the disconnect is verified. With this condition present at the end of memory cycle $M_2$ in a command cycle, the marker is requested by answer decoder 333, and upon seizure, the number of the originating concentrator 101 again is stored in originating concentrator storage 501. However, instead of storing the calling line number at this time, the number of the corresponding time slot is transferred from command sender 332 to counter 516. At this point the junctor gate memories are examined in order to locate the number of the particular junctor connected to highway 105 in this time slot. The desired junctor number then is registered in junctor number storage 505.

In order to understand the subsequent operations in the marker required to identify the called line, the peculiar nature of the pulse shifter memory operation should be clarified. As indicated hereinbefore, the junctors in switching network 220 are operated in pairs to facilitate a reduction in memory requirements. Thus a connection will be established for transmission of information in both directions through an input pulse shifter in one direction and an output pulse shifter in the opposite direction. The fact that different types of pulse shifters are utilized in the single junctor pair permits control of a pair of pulse shifters by the use of a single pulse shifter memory, the same information contained therein controlling both pulse shifters. For example, in the arrangement illustrated in FIG. 3, if information contained in time slot 7 is to be shifted to time slot 10 in output pulse shifter 325, then information in time slot 10 must be shifted to time slot 7 in input pulse shifter 322. To accomplish this interchange, pulse shifter memory 329 stores the number 3 in time slot 10. Output pulse shifter 325, having a single input and a plurality of outputs, one in each time slot position, will utilize the information from pulse shifter memory 329 to enable the (10–7) modulo 20 position or third output gate in time slot 10 such that a signal inserted in time slot 7 will emerge in time slot 10. Similarly, input pulse shifter 322, having an input in each stage and a single output, will enable the (7–10) modulo 20 position or third input gate in time slot 10 upon receipt of the same information from pulse shifter memory 329 such that a signal will be inserted in a position corresponding to time slot 10 and will emerge in time slot 7.

Thus considering, first, that input pulse shifter 322 receives the calling line input from the junctor, the information contained in pulse shifter memory 322 in the corresponding time slot (the number 3 in the example) is registered in counter 513 through operation of time slot marker 508. Subtractor adder 512 now operates to determine the time slot of the called line (7) by comparing the content of counter 516, which contains the time slot assigned to the calling line (10) with the content of counter 513, which contains the difference (3) between the time slots assigned to the calling and called lines.

If, instead, output pulse shifter 325 receives the calling line input from the junctor, the number of the time slot assigned to the called line must be obtained in a different manner. Counter 513 in this instance adds one to the number (7) in counter 516, corresponding in this instance to the calling time slot, for each subsequent time slot. As the count is increased, the content of counter 513 is compared with the content of the pulse shifter memory involved. When a match occurs (3 at count of 10), counter 513 discontinues the count and the sum of the content of counters 513 (3) and 516 (7) as obtained in subtractor adder 512 is registered in counter 517 (10) and corresponds to the time slot assigned to the called line. The junctor gate memories are examined at this time utilizing the time slot number recorded in counter 517, which identifies the time slot assigned to the calling line. Upon locating the time slot number in the junctor gate memory, the content is registered in terminating concentrator and line number storage 502 and 504.

With counters 516 and 517 now containing the time slot designations for the calling and called lines, respectively, the corresponding time slot markers 506 and 507 are enabled to erase the content of the appropriate long memories. The various control devices active on this connection are released in similar fashion. Thereafter, the marker itself is released and the operation is terminated.

ERROR DETECTION AND CORRECTION

The parity bits inserted in each command assure that the commands will be received free from the occurrence of single errors in transmission. In order to counteract double errors in transmission, particular attention is paid to the command order which may result from a double error in any command order to be transmitted. Thus, for example, the three bit order code in the "scan for service request" command is chosen such that, if it is altered by the occurrence of two simultaneous errors, it will have the appearance of one of the command orders to verify, change the call progress, or erase. In this instance a simple comparison of the time slot designated in the command with the designation of the control time slot in remote control 202 will reveal this double error since the "scan for service request" command always contains the control time slot designation, while the commands to verify, change the call progress or erase never contain the control time slot designation. If the error is detected, the command will not be executed and remote control 202 will direct answer generator 205 to transmit the answer 0000 . . . 00 serving to maintain the current call progress state and to retransmit the command.

The order code adopted for the "scan for disconnect" command may be altered by a double error so as to give the appearance of the command to verify or erase. Again this error may be detected simply by checking the time slot designation.

The order code for the "verify" command will be changed by a double error into one of the two scan commands, or into the "erase and store" command. An error producing the latter command cannot be detected but the effect is of no consequence since the "erase and store" command can only result in the correct information subsequently being stored in remote memory 203. An error resulting in one of the two scan commands may be detected by checking the time slot designation as before.

The balance of the commands have order codes arranged to permit detection and correction of double errors in similar fashion, viz., assuring that the errors can only transform the desired order code into order codes which will have basically no effect on the continued proper performance of the system.

With regard to double errors occurring in the time slot and subscriber line designations contained in the commands, provision is made for their detection and correction in a somewhat similar fashion. Thus a double error occurring in the time slot designation in the "scan for service request" command is readily detected due to the fact that only the nineteenth or control time slot should be designated in this command. When the error is detected by comparison of the transmitted time slot designation with the control time slot designation in remote control 202, the command will not be executed and the answer command 0000 . . . 00 will be transmitted to the central office. A double error change in the line number designation for this command may result in the scan of an active subscriber line such that an off-hook scan indication will be reported to the central office for the originally designated subscriber line which may, in fact, be on-hook. Since the answer command advances the call progress state such that the next command should verify this off-hook condition, transmission of the correct line number designation at this time will reveal that the designated subscriber line is, in fact, on-hook and the error is corrected.

A double error in the time slot designation in a "scan for disconnect" command will be detected as in the preceding case. A double error in the subscriber line designation in this instance may result in the scanning of an idle subscriber line such that the answer command will indicate a disconnect. However, the next command intended to verify the disconnect will reveal that the correct subscriber line is, in fact, still active and the error will be corrected.

A double error in the commands to verify, erase or change the call progress state which occurs in the time slot or subscriber line designation is readily detected upon comparison of the specified time slot and subscriber line designation with those stored in remote memory 203. Upon detection of the double error in this fashion, the command will not be executed and the answer command 1010 . . . 10 will be sent to the central office requesting transmission of "erase and store" command.

A double error occurring in the time slot or line number designation in the "store" command results in the storage of incorrect information in remote memory 203 but this mistake is corrected upon subsequent receipt of the "verify" command.

Finally, a double error occurring in the time slot or line number designation in the "erase and store" command would occur only when the previous command was subject to a double error. Therefore, incorrect information can be written in remote memory 203 by this command only upon the occurrence of a quadruple error, the likelihood of which is remote.

Since the entire system operation relies solely upon the receipt and proper execution of commands in a remote concentrator, it is essential that the time of arrival of a command in a remote concentrator be precisely defined. The twentieth time slot is reserved for frame synchronization in order to assure that once in each twenty time slot interval or frame the arriving information will be synchronized with the operations performed in the concentrator, this function being performed in synchronization circuit 207. As indicated hereinbefore, the commands themselves are transmitted in the nineteenth or control time slot, the remaining eighteen time slots being reserved for transmission of intelligence and called subscriber line designations.

Commands are transmitted one bit per frame and each comprises twenty-two bits. System requirements dictate that each of the 127 subscribers be scanned at least six times per second so that the time available for the generation, transmission and processing of a command and its answer should be less than 1.2 milliseconds. With a frame interval of twenty microseconds, these functions can be accomplished well within the prescribed time limit, while still permitting the use of a command synchronization code preceding the transmission of each command. This code, of course, is extremely important in that any error existing in its content which alters the apparent beginning of the command itself will completely destroy the effectiveness of the command.

The command synchronization code, should be long enough to prevent the identical pattern from appearing in a command and yet not so long as to require an excessive amount of time for its transmission. A command can contain a maximum of eight successive "1's" so that if a series of "1's" is adopted as the pattern for the synchronization code, its length should exceed eight "1's." With a double error the number of successive "1's" in a command can be increased to a maximum of fourteen. Thus to guard against this possibility, the synchronization code would have to obtain more than fourteen successive "1's." If more than two errors are present in the command, the successive "1's" will be extended beyond the length for which a synchronization is feasible. The upper limit on the length of the synchronization code is determined by the signal transmission time available in the system.

Taking these factors into account, various patterns for possible command synchronization code are indicated in FIGS. 5A–5C. Errors are indicated by an "$x$" and the border between the synchronization code and a command by closely spaced, parallel vertical lines "||." The particular code designated in level one of FIG. 5A is formed by adding $n=1$ digits to the basic pattern; vis., a "0" follows the ten successive "1's." This code is shifted as indicated in the second and third levels of FIG. 5A by a double error, thus altering the beginning of the command. The code pattern indicated in FIG 5B adds $n=5$ digits to the basic pattern, a "10" at the beginning and a "010" at the end of the basic ten "1's" code, thereby producing a code which cannot be shifted by less than three simultaneous errors. The pattern indicated in FIG. 5C, which adds "110" at the beginning and "010" at the end of the ten "1's" code produces a shift in the beginning of a command only due to five simultaneous errors, the likelihood of which is extremely remote. The length of this pattern is sixteen bits which will satisfy the timing requirements of the system. Thus the addition of $n=6$ digits to the basic pattern provides an optimum code pattern which will prevent a shift in the basic pattern despite the presence of errors in less than $n-1$ digits.

The answer command may be much shorter. In fact, an eight bit pattern of 11111111, 10101010 or 00000000 will be sufficient for the three possible answers and no synchronization code is required. This is true since any answer containing as many as three errors will be treated in the same manner at the central office as if it were a "00000000," viz., the command will be retransmitted. Thus the answers themselves provide a triple error detecting code, the response to which will not affect system operation adversely.

As noted earlier, each of the 127 subscriber lines should be scanned six times per second or approximately once every 1.2 milliseconds. This implies that the time required to complete one command sequence, i.e., generation, transmission and processing of a command and receipt of the answer, should not exceed forty frames, each of twenty microseconds duration, after taking into account the command synchronization code. The command itself requires twenty-two frames, and the answer eight frames. In addition, three frames are required for the central office to generate the command and three frames to process it in the remote concentrator. This allows a maximum of four frames, or eighty microseconds, for transmission in both directions. Assuming a transmission speed of two-thirds that of light, the maximum distance between central office and concentrator is roughly eight kilometers.

SYSTEM OPERATION

A clearer understanding of the novel system components may be gained from considering the system operations involved in completing a call connection. Such operations may be followed by reference to the flow charts of FIGS. 6 and 7 in conjunction with the system arrangement illlstrated in FIGS. 1 through 3B. In FIG. 6 each block represents the call progress state present in a particular time slot and the conditions depicted on the arrows between blocks are those required to advance the operation in the particular time slot to the state indicated in the next block.

Each idle subscriber line in concentrator 101 is scanned periodically in response to a distinct command from central office 100. If the identity of a currently scanned line is not stored in long memory 330 and is also identified by scan circuit 210 as being off-hook, and if marker 335 is idle, address decoder 333 will seize the marker. Upon seizure by concentrator 101, marker 335 begins comparing idle time slots for concentrator 101 with idle time slots of register 345. If a common idle time slot is found, the line number corresponding to a calling subscriber station, e.g., 111, is stored in a long memory 330 corresponding to concentrator 101 in that time slot. The call progress then is advanced from CP10, indicating the idle state, to CP20, suspect request for service, i.e., the state in which the scanned line is off-hook and no information for the scanned line was previously stored in long memory 330.

Figure 7:
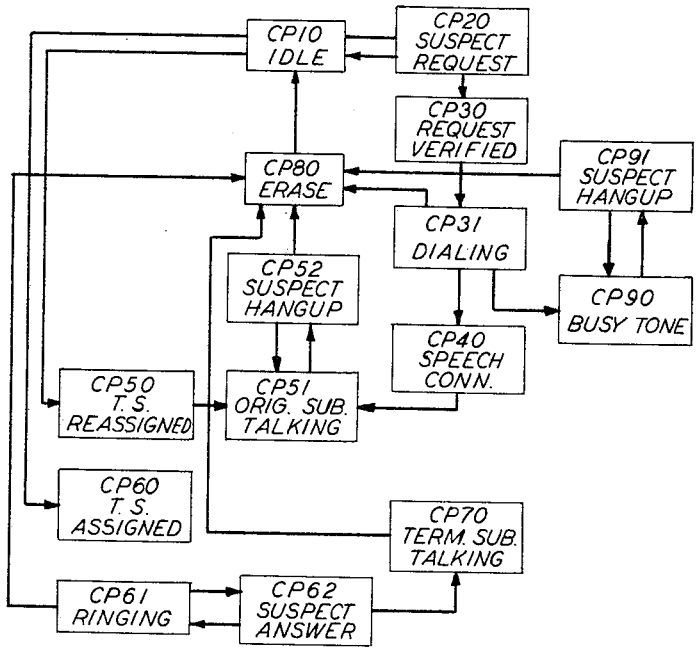
FIG. 7 is a flow chart depicting the sequence of operations followed in the establishment of a call through the system and termed the call progress CP.

Thus central office 100 now suspects that the subscriber at station 111 is requesting service and has reserved the register 345 in an assigned time slot to receive dial pulses, as indicated by the dial progress in the chart in FIG. 7 proceeding from DP10, the idle register condition, to DP20, register reserved in a particular time slot. This dial progress is reflected in a separate memory associated with register 345. In the next scan cycle, if line scanner 210 again reports station 111 off-hook, the call progress will advance to CP30, indicating a request for service verified, and concurrently the dial progress will advance to DP30 in which the engaged register 345 will transmit dial tone to station 111 in the assigned time slot.

In CP30 the command to write the identifying number for station 111 in remote memory 203 at concentrator 101 is transmitted if no command of higher priority is required. If the write command is performed correctly upon transmission in the nineteenth time slot to concentrator 101, as verified by the return command in the next appearance of the nineteeth time slot, the call progress is advanced to CP31, the dialing state. In this state concentrator 101 samples the line loop of station 111 in successive appearances of the assigned time slot and, concurrently, dial tone is transmitted from register 345.

When the subscriber begins dialing, the dial progress state will change from DP30 to DP40 upon appearance of the first dial break. If the dial make condition occurs at the expected time, the dial progress state will again change, this time to DP41, reflecting the dial make for the first digit. The following break interval, which normally follows the short make interval in the dialing sequence, restores the dial progress to DP40. The number of transitions between DP40 and DP41 are counted by register 245, thereby storing the first dialed digit.

If the duration of DP41 exceeds the normal dial make interval, the intermediate make or pause between dial digits is identified, and the dial progress state is advanced to DP50, the dial pause first digit. A similar pattern is followed for the second digit, with the counting of digits occurring between DP51 and DP52, a third digit between DP61 and DP62 and a fourth digit between DP71 and DP72. This sequence will, of course, continue until all digits have been registered.

If the break interval at any point in the sequence exceeds the short break interval, the operation will advance to dial progress state DP11, indicating that the subscriber at station 111 has discontinued dialing and has hung up. Such a condition will advance the call progress state from CP31, the dialing state, to CP80, the erase state, and register 345 is released. The release of register 345 returns the dial progress to DP10, the register idle state.

If the full complement of digits is received (in this instance 4) followed by the intermediate digit interval, dial progress advances from DP72 to DP80, indicating completion of the dialing operation. In this state register 345 will seize marker 335, and when seizure has been effected, dial progress will advance to DP90, reflecting this condition. During DP90 the digits identifying a called line as stored in the assigned register 345 upon receipt from calling station 111 are transferred to marker 335, whereupon register 345 is released and the dial progress returns to DP10.

Marker 335 decodes the digits identifying the called line, first identifying the particular concentrator which terminates the called line. Subsequent to this identification the long memory of the corresponding concentrator is accessed by marker 335 and the busy test of the called line is performed. Such a busy test involves comparison of the called line designation contained in the marker, with all of the active lines stored in the corresponding long memory. If the called line is idle, one of the junctors in the switching network is selected randomly and the primary junctor matching operation is performed. Such an operation involves a determination of the availability of a primary junctor crosspoint in the time slot assigned to calling line 111. This operation is performed by comparison of the time slot designation with those stored in the junctor gate memory such as 327. If the primary junctor matching succeeds, junctor matching is conducted by a similar comparison involving junctor gate memory 328.

If junctor matching is achieved without time slot reassignment, the time slot allotted to connection of register 345 may also be utilized for the subsequent speech connection. In this case the call progress state in the same time slot is advanced to CP40, designated the speech connection. In this state a command is transmitted to the concentrators terminating boh calling and called lines requesting that the call progress state registered in the corresponding remote memory 203 be changed to the speech transmission state in which subsequent samplings of the lines will be of speech signals which will be coded for subsequent transmission to central office 100. If this command is executed properly, as reflected by the return command in time slot 19 of the next office cycle, the call progress is advanced to CP51, subscribers talking.

In those instances in which the originally assigned time slot is not commonly idle in both concentrators, a time slot reassignment is required and the call progress of the time slot assigned to register 345 is advanced from CP31, the dialing state, to CP80, the erase state, and the call progress state of a new time slot assigned at this point advances from CP10 to CP50. In order to facilitate this change, the line number as stored in long memory 330 is shifted from the formerly assigned time slot to the currently assigned time slot. In state CP80 a command is transmitted to concentrator 101 to erase the line number from the time slot previously assigned, thereby releasing that time slot and restoring the call progress to CP10. In CP50 the write command is again sent to concentrator 101, in this instance to write the calling line designation in the newly assigned time slot, and if this command is executed properly, call progress advances to CP51, the talking state.

At the long memory of the terminating concentrator the call progress state in the newly assigned time slot proceeds from CP10 to CP60, designating that the time slot is assigned. In CP60 the write command is transmitted to the terminating concentrator to write the designation of the called line in the assigned time slot and if this command is executed properly, call progress proceeds to CP61, the ringing state. At this time tone gate memory 341 is enabled to connect tone source 340 to the network at central office 100 for transmission of appropriate ringing and ringback tones. In this instance ringing tone is transmitted to the terminating concentrator via the receive lead of the corresponding highway, while ringback tone is transmitted to the originating concentrator via the send lead of the same highway and through a pulse shifter to the receive lead of the highway corresponding to the originating concentrator. When the called party answers and the off-hook condition detected at the terminating concentrator is reported to central office 100, the call progress advances from CP61 to CP70, the talking state for the terminating subscriber line, by way of CP62, suspect answer.

If the called station is busy or if junctor matching cannot be achieved, the call progress is advanced from CP31 to CP90, the busy tone state, and an appropriate tone is delivered by the corresponding tone source 340 via highway 105 and the originating concentrator 101 to the calling station 111. This system operates on a called party release basis in which the calling party controls disconnect. Thus if the called party hangs up first, the speech path is not released. However, if a talking party having the call progress state CP51 in his time slot should hang up, the disconnect condition is detected by the "scan for disconnect" command and the call progress state is advanced to CP52, suspect disconnect. If this condition is verified during the succeeding scan of the calling telephone line, marker 335 is engaged, if idle. Upon erasure, marker 335 traces the route of the call and releases all of the equipment engaged in maintaining the call connection. At this point the call progress of both stations is advanced to CP80, the erase state.

It is to be understood that the above-described arrangement is illustrative of the application of the principles of the invention. Numerous other arrangements may be devised by those skilled in the art without departing from the spirit and scope of the invention.

What is claimed is:

1. A communication system comprising a plurality of lines, a line concentrator terminating certain of said plurality of lines, a central office for establishing and controlling call connections among said plurality of lines, and a highway for transmitting intelligence and control signals bewteen said line concentrator and said central office comprising a two-wire path for transmitting all of said signals from said line concentrator to said central office and another two-wire path for transmitting all of said signals from said central office to said line concentrator.

2. A communication system comprising a plurality of lines, a line concentrator terminating certain of said plurality of lines, a central office for establishing and controlling call connections among said lines, and a four-wire highway for transmission of signals in opposite directions between said line concentrator and said central office, means in said line concentrator for applying intelligence signals being transmitted from said certain lines actively engaged in call connections to a distinct two-wire path in said highway, and means for applying to said distinct path all control signals developed in said line concentrator which are required by said central office in the establishment and maintenance of said call connections.

3. A communication system comprising a plurality of lines, a line concentrator terminating certain of said plurality of lines, a central office for establishing and controlling call connections among said lines, and a four-wire highway for transmission of signals from said line concentrator to said central office via a first two-wire path and from said central office to said line concentrator via a second two-wire path, means in said central office for applying intelligence signals being transmitted to said certain lines actively engaged in call connections to said second two-wire path in said highway, and means for applying to said second path all control signals developed in said central office which are required by said line concentrator in the establishment and maintenance of said call connections.

4. A time division communication system comprising a line concentrator terminating a plurality of lines, a central office for establishing and controlling call connections among said lines, and a highway providing the only connection between said line concentrator and said central office, said highway comprising a send path and a receive path for transmission of all signals in opposite directions between said line concentrator and said central office, each of said paths being divided into distinct time channels, certain of said channels being assigned to the transmission of signals between lines engaged in call connections and a distinct one of said time channels being assigned to the transmission of all control signals necessary to the establishment and maintenance of said call connections, said concentrator comprising means for receiving commands from said central office via said control time channel in said highway receive path requesting changes in the status of call connections, means for comparing the content of the command with previously stored control information and means for generating an answer command for transmission over said control time channel in said highway send path to inform said central office of the disposition of each of said commands.

5. A communication system comprising a plurality of line concentrators each terminating a distinct plurality of lines, a central office for establishing and controlling call connections among said lines, and a common transmission highway corresponding to each of said concentrators and providing the only connection between said central office and the corresponding one of said concentrators, each of said highways comprising a two-wire send path and a two-wire receive path for transmission in opposite directions, means for applying intelligence signals from a line active on a call connection to the send path of the highway corresponding to the concentrator terminating said line, and means for applying to said send path all control signals generated in said terminating concentrator and required in said central office to establish and maintain call connections through said terminating concentrator.

6. A communication system in accordance with claim 5 and further comprising means for applying signals from lines engaged in call connections to the receive path of said corresponding highway and means in said central office for applying to said receive path all control signals generated in said central office and required in said terminating concentrator to establish and maintain call connections through said terminating concentrator.

7. A communication system comprising a central office, a plurality of lines, a concentrator terminating said lines, a common transmission highway connected between said concentrator and said central office comprising send and receive paths, means for transmitting information developed in said lines between said concentrator and said central office via said send and receive paths, means for transmitting commands from said central office to said concentrator via said receive path requesting changes in the status of call connections, and means operative to formulate new commands in response to receipt of answer commands from said concentrator via said send path indicating that the requested changes were effected.

8. A communication system in accordance with claim 7 wherein each of said paths is divided into distinct time channels, said commands being transmitted to said concentrator via a distinct one of said time channels in said receive path and said answer commands being transmitted to said central office via a distinct one of said time channels in said send path.

9. A communication system comprising a central office, a plurality of lines, a plurality of remote concentrators each terminating a distinct group of said lines, a common transmission highway connected between each of said concentrators and said central office, means for transmitting information developed in said lines between said concentrator and said central office via the corresponding transmission highways, means for transmitting commands from said central office to each of said concentrators via the corresponding transmission highways for controlling the establishment of call connections among said lines, and means in said central office responsive to the receipt of command responses from each of said remote concentrators for processing individual call connection requests.

10. A communication system in accordance with claim 9 wherein said common transmission highways are each divided into distinct time channels and further comprising means for engaging the idle call processing means to assign an idle time channel to a calling line, means operative thereafter to engage the call processing means to assign an idle time channel to a called line thereby completing a call connection, and means for subsequently engaging the idle call processing means upon receipt of a disconnect indication from the calling line to disestablish the call connection.

11. A communication system comprising a plurality of concentrators each terminating a distinct plurality of lines, a central office for establishing and controlling call connections among said lines, and a common transmission highway corresponding to each of said concentrators and providing the only connection between the central office and the corresponding one of said concentrators, said central office having control equipment corresponding to each concentrator comprising a command sender for sending commands to the corresponding concentrator requesting changes in the status of call connections and an answer decoder for receiving answer commands from the corresponding concentrator, said central office further comprising a line number register and a marker circuit for supervising the processing of all call connections and with only one call connection being processed at a time, said answer decoder engaging the idle marker circuit to assign an idle time channel to a calling line, said line number register engaging said idle marker circuit to assign an idle time channel to a called line thereby completing a call connection, and said answer decoder subsequently engaging said idle marker circuit upon receipt of a disconnect indication from said calling line to disestablish the call connection.

12. A commuication system in accordance with claim 11 wherein all of the characters in each message required for control of the call connections involving lines terminating on one of said concentrators are stored in a distinct memory at said central office in a distributed form in which a different character is stored in each appearance of a distinct time slot in a repetitive cycle of time slots, which distinct time slot corresponds to the time channel assigned to one of the call connections.

13. A communication system comprising a plurality of line concentrators each terminating a distinct plurality of lines, a central office for establishing and controlling call connections among said lines, and a district transmission highway connected between the central office and each of said line concentrators, each of said highways comprising a single path carrying all signals transmitted from the central office to the corresponding line concentrator.

14. A communication system in accordance with claim 13 wherein said central office comprises means for registering designations of lines engaged in call connections in succession, memory means for storing the characters of a message required for control of a call connection, and a marker circuit for processing all call connections, said marker circuit comprising means for assigning an idle communication channel in said highway to a calling line by comparison of an avaliability indication received from said registering means with one character in each of said stored messages.

15. A communication system in accordance with claim 13 wherein said central office comprises memory means for storing the characters of a message required for control of a call connection, means for generating a designation of each line number successively, means for comparing one of said line number designations with a character from each message stored in said memory means, and means responsive to a match in said comparing means for retrieving the message containing the matching character from said memory means.

16. A communication system in accordance with claim 13 wherein said central office comprises means for transmitting commands to said line concentrator requesting changes in the status of call connections and means for transmitting a command synchronization code in advance of each command to permit recognition in the concentrator of the beginning of a command, said code comprising a sequence of identical binary digits exceeding the maximum number which will be encountered in an error-free command and bounded by digit combinations totaling $n$ binary digits which will prevent a shift in the sequence of identical binary digits despite the presence of errors in less than $n-1$ digits.

17. A communication system comprising a line concentrator terminating a plurality of lines, a central orifice for establishing and controlling call connections among said lines, and a transmission highway connected between said line concentrator and said central office comprising a single path carrying all signals transmitted from said line concentrator to said central office, said line concentrator comprising means responsive to detection of errors in signals received from said central office for transmitting a command via said path which instructs the central office to correct the error.

18. A communication system comprising a line concentrator terminating a plurality of lines, a central office for establishing and controlling call connections among said lines, and a transmission highway connected between said line concentrator and said central office comprising a single path carrying all signals transmitted from said line concentrator to said central office, said line concentrator comprising memory means for storing one of two call status indications received from said central office concerning a particular one of said lines, means responsive to storage of said first call status indication for transmitting to the central office an indication of the condition of said particular line, and means responsive to storage of said second call status indication for transmitting a coded intelligence signal sample from said particular line to said central office.

References Cited

UNITED STATES PATENTS

| | | |
|---|---|---|
| 2,957,949 | 10/1960 | James et al. |
| 3,023,278 | 2/1962 | James et al. |
| 3,217,107 | 11/1965 | Schorum. |
| 3,223,784 | 12/1965 | Inose et al. |
| 3,304,373 | 2/1967 | Wright. |

WILLIAM C. COOPER, Primary Examiner

Dedication

3,492,435.—*Hiroshi Inose* and *Tadao Saito*, Tokyo, Japan. FOUR-WIRE CONCENTRATOR WITHOUT SEPARATE CONTROL PATH. Patent dated Jan. 27, 1970. Dedication filed Dec. 15, 1980, by the assignee, *Bell Telephone Laboratories, Incorporated.*

Hereby dedicates the entire remaining term of said patent to the Public.

[*Official Gazette February 24, 1981.*]